(12) United States Patent
Peters et al.

(10) Patent No.: US 8,165,103 B2
(45) Date of Patent: Apr. 24, 2012

(54) METHOD AND ARRANGEMENT FOR PREAMBLE DETECTION

(75) Inventors: Gunnar Peters, Stockholm (SE); Erik Nordhamn, Storvreta (SE); Georg Mesko, Järfälla (SE); Björn Forsberg, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 586 days.

(21) Appl. No.: 12/304,804

(22) PCT Filed: Jun. 13, 2006

(86) PCT No.: PCT/SE2006/050195
§ 371 (c)(1), (2), (4) Date: Jul. 16, 2009

(87) PCT Pub. No.: WO2007/145555
PCT Pub. Date: Dec. 21, 2007

(65) Prior Publication Data
US 2010/0067511 A1 Mar. 18, 2010

(51) Int. Cl.
*H04B 7/216* (2006.01)
(52) U.S. Cl. ....................................................... 370/342
(58) Field of Classification Search .................... 370/342
See application file for complete search history.

(56) References Cited

U.S. PATENT DOCUMENTS

| 6,381,229 | B1 * | 4/2002 | Narvinger et al. | 370/328 |
|---|---|---|---|---|
| 6,643,275 | B1 * | 11/2003 | Gustafsson et al. | 370/328 |
| 7,072,384 | B2 * | 7/2006 | Tanaka | 375/149 |
| 7,103,084 | B2 * | 9/2006 | Jang et al. | 375/130 |
| 7,386,005 | B2 * | 6/2008 | Lugil et al. | 370/464 |
| 7,653,016 | B2 * | 1/2010 | Georgeaux et al. | 370/311 |
| 2005/0238053 | A1 * | 10/2005 | Iochi et al. | 370/473 |

FOREIGN PATENT DOCUMENTS
EP 1313229 A2 5/2003

OTHER PUBLICATIONS

Motorola Texas Instruments "Proposals for RACH Preambles" in TSG-RAN Working Group 1 meeting #6, Espoo. Finland, Jul. 13-16, 1999, pp. 1-4, 9-13.

* cited by examiner

*Primary Examiner* — Kenny Lin

(57) ABSTRACT

In a hardware accelerator for preamble detection of a Physical Random Access Channel (PRACH) in a CDMA based communication system, buffering means stores input samples received at an antenna at a first rate, addressing means read a predetermined consecutive number of the input samples in parallel at a second different rate. The hardware accelerator is further partitioned into a reusable unit providing code correlation, and a preamble detection dedicated unit providing signature code despreading. The reusable unit comprises means for correlating at least a subset of the previously read input samples with a predetermined code to provide a correlation output for a number of time lags. The preamble detection dedicated unit comprises means for preamble detection configured for providing Hadamard Transformation of the correlation output to enable preamble detection, and all means are arranged on a single hardware chip to enable high-speed data transmissions between the respective means.

12 Claims, 9 Drawing Sheets

REPEATED SIGNATURE CODE

X

4096 CHIP OF SCRAMBLING CODE

=

COMBINED CODE TO BE SENT DURING ACCESS SLOT

METHOD AND ARRANGEMENT FOR PREAMBLE DETECTION

TECHNICAL FIELD

The present invention relates to CDMA (Code Division Multiple Access) based telecommunication systems and chip rate accelerators in such systems in general, and specifically to hardware accelerators for preamble detection in such systems.

BACKGROUND

In CDMA-based systems, narrowband signals (as represented by a sequence of symbols) are translated into signals with wider bandwidth (as represented by a sequence of chips) via a technique known as spreading. In simplified terms, a symbol to be transmitted is converted into a longer sequence of chips. This sequence is constructed by multiplying each complex symbol with the time varying complex spreading code sequence, which is different for each channel.

The so-called PRACH (Physical Random Access Channel) is a UMTS (Universal Mobile Telecommunication System) uplink common physical channel, i.e. it is shared between all user equipment (UE) within a cell. Each user equipment in the cell utilizes the PRACH to send signaling information such as a call origination requests to the UTRAN (Universal Terrestrial Radio Access Network) and, if necessary, a small amount of user data, such as short messages, alphanumerical texts, and so on. Every UE that wants to use the PRACH randomly selects an access slot number and a 16 chip long signature code, see FIG. 1. Each access slot is 5120 chip long, and the timing of the access slots is defined relative to the AICH (Acquisition Information Channel) Downlink Channel. The signature code is any one of the 16 Walsh codes of length 16.

The cell can be set up with a subset of valid access slots and signature codes. In that case, the UE has to select from the valid subset.

In general, during the selected access slot, the UE sends a combined code obtained by multiplying the 4096 chip of the PRACH scrambling code with the 16 chip signature repeated 256 times, as illustrated in FIG. 2.

At a receiving unit, the combined code needs to be subjected to preamble detection, other chip rate operations such as cell searching and despreading.

Depending on the position of the UE in the cell the delay of the UE, compared to the system time, will vary. Since the position initially is unknown, the uncertainty in delay is equal to the entire cell radius. The preamble detection part of RACH is basically a correlation based synchronization procedure that both detects the presence of a UE and estimates the delay compared to the access slot. Due to the uncertainty in delay the 4096 chip that constitutes the preamble code according to system time is extended with $$W=2*R/78+\beta [chip] \quad (1)$$

corresponding to a search window W equal to the cell radius R, the term $\beta$ represents an uncertainty in the window.

These $W_{extended}=4096+W$ [chip] are then correlated with the combined codes for all possible delays and all valid signature codes to form one Power Delay Profile (PDP) per signature code. The PDP peaks of each signature is then validated against a threshold, and if a valid peak is found the corresponding Round Trip Delay (RTD) of the user is calculated from the delay corresponding to this peak.

In case of a varying radio channel, summing coherently over all 4096 chip is not optimal. The PDP formatting part of the algorithm is then typically performed separately for small sections of the 4096 chip sequence. The PDP:s from all sections are then summed non-coherently before peak validation.

The length of such a section is given by $$N*16 \quad (2)$$

where N is an integer that divides 256.

In any known commercial hardware for WCDMA base band processing, the huge complexity of the preamble detection forces the use of dedicated hardware accelerators HWA or so-called co-processors for the above described correlation operations.

At present, there are different types of HWA dedicated for preamble detection. Some are highly specialized HWA that cannot perform other chip rate tasks such as synchronization of other physical channels, path searching, or symbol despreading in a Rake receiver. Some are general purpose HWA that perform correlation or despreading with general spreading codes, and can be used for any CDMA chip rate task.

There is also a division between external HWA, e.g. ASICs connected to the DSP, loosely coupled HWA and tightly coupled HWA. For loosely coupled HWA, the antenna data, that constitutes the input to the HWA, does not enter the DSP cores. Tightly coupled HWA are computational units in the DSP:s that support chip rate task instructions, and the antenna data enters these units as inputs to special functions called from the DSP.

Regardless of any of the above implementations, there is a need for improved methods and arrangements for receiving and decoding the PRACH combined code with reduced complexity and increased speed.

SUMMARY

An object of the present invention is to provide improved hardware accelerator devices for preamble detection.

Another object is to provide a general-purpose hardware accelerator device suitable for various chip rate operations, including preamble detection.

Yet a further object is to provide a general-purpose hardware accelerator enabling partitioned preamble detection functionality with reduced complexity.

A further object is to provide preamble detection functionality partitioned into two separate functionality modes.

A further object is to enable implementing effective preamble detection, searching, and despreading using the same hardware resources.

A specific object is to enable a hardware accelerator for preamble detection enabling pooling of resources, i.e. the possibility to use the same hardware resources for despreading and searching.

According to a first aspect the present invention comprises a hardware accelerator 1 for preamble detection, which supports a partitioned preamble detection functionality wherein the hardware accelerator 1 comprises a buffer unit 10, an addressing unit 20, at least a reusable unit for code correlation 30, at least one preamble detection dedicated unit 40 for signature despreading.

According to a specific aspect a hardware accelerator 1 useable for preamble detection of a Physical Random Access Channel (PRACH) in a CDMA based communication system, comprises a storing/buffering unit 10 for storing input samples received at a first rate at an antenna, a reading unit 20 for reading a predetermined consecutive number of the received input samples in parallel at a second different rate.

Further, the hardware accelerator 1 is partitioned into a reusable unit providing code correlation, and a preamble detection dedicated unit providing signature code despreading. The reusable unit comprises a correlating unit 30 for correlating a subset of the read predetermined consecutive number of input samples with a predetermined code to provide a correlation output for a preset number of time lags. Finally, the preamble detection dedicated unit comprises a preamble detection unit 40 for providing Hadamard Transformation of the correlation output to enable preamble detection. All said units 10, 20, 30, 40 are arranged on a single hardware chip or board to enable high-speed data transmissions between the respective means.

According to a further specific aspect, the present invention comprises a method for providing the above mentioned hardware accelerator.

Advantages of the invention comprise:
The main advantage of the invention is the decrease in complexity for preamble detection where the same hardware resources can be pooled between general chip rate functions and preamble detection.

BRIEF DESCRIPTION OF THE DRAWINGS

The invention, together with further objects and advantages thereof, may best be understood by referring to the following description taken together with the accompanying drawings, in which.

DETAILED DESCRIPTION

Figure 1:
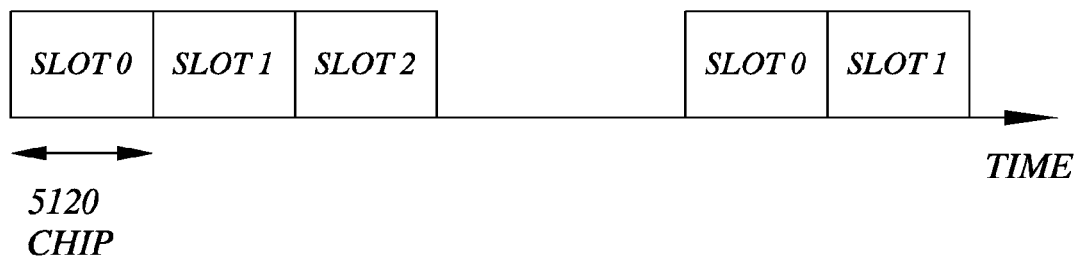
FIG. 1 illustrates a known plurality of periodically occurring access slots.
Figure 2:
FIG. 2 illustrates the known construction of a preamble detection combined spreading code.
Figure 2:
Figure 2:
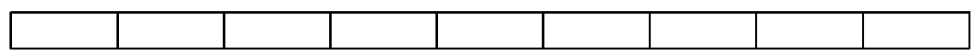

The various aspects of preamble detection and other chip rate functionalities will be described below.

One measure of the resource cost for i.e. preamble detection is the so-called complexity, typically expressed in dimensions of operations per second. Below, expressions for the complexity are given in terms of cell radius (R), number of non-coherent accumulations (N), and number of signatures (nrSignatures). As an example these expressions are evaluated for R=70 km, N=64 and nrSignatures=16.

A known straightforward correlation synchronization i.e. preamble detection performed separately for all possible combined codes gives a complexity proportional to $$W_{ext} * 4096 * nrSignatures * (3.84*10^6/5120) = 106*10^9 \text{ [MAC/s]} \quad (3)$$

where $W_{ext}$ is the before mentioned extended window, $3.84*10^6$ is the number of chips per second, and 5120 is the number of chips per access slot. The thus calculated complexity is a measure of the number of multiplication and accumulation operations performed for a window expressed in Multiplication and ACcumulation operations per Second (MAC/s).

Below a known two-step process of reducing the above described complexity will be described:

Step 1

The above-calculated complexity can be reduced using the structure of the combined code.

Let $\{s_i\}_{i=0}^{4096-1}$ be the periodically extended signature code, $\{c_i\}_{i=0}^{4096-1}$ the relevant part of the scrambling code and $\{r_i\}_i$ the received samples at chip rate. Then the correlation with the corresponding combined code for one time lag L is given by:

$$\sum_{i=0}^{16*N-1} s_i \cdot c_i \cdot r_{i+L} = \sum_{l=0}^{15} \sum_{k=0}^{N-1} s_{16k+l} c_{16k+l} r_{16k+l+L} = \sum_{l=0}^{15} s_l \sum_{k=0}^{N-1} c_{16k+l} r_{16k+l+L} \quad (4)$$

where the time index i is represented by i=16k+l and the periodicity of the signature code has been used.

The inner sum is now independent of the signature code i.e. equal for all signature codes and can be reused for all 16 signature codes. Note that the inner sum only sums every $16^{th}$ chip, which chips to use depends on the index l of the outer sum. As will be described below, the outer sum constitutes Hadamard Transformation. Consequently, the complexity for calculating all necessary despreading operations is reduced to:

$$W_{ext} * (4096 + 16 * nrSignatures * 4096/(16*N)) * 3.84*10^6/5120 = 11*10^9 \text{ [MAC/s]} \quad (5)$$

For a tightly coupled HWA it is possible to rearrange the antenna data before correlation to obtain the sum over every 16 chip. The output can then be Hadamard Transformed in software on the DSP cores.

Step 2

If all 16 signatures are to be used, the fact that the signature codes are all the Walsh codes of length 16 enables use of the so-called Fast Hadamard Transform (FHT) for the last sum in Equation (4).

A straightforward summation gives a complexity for calculating the sums $$\sum_{i=0}^{2^n-1} s_i t_i \quad (6)$$

for any sequence $t=\{t_i\}_{i=0}^{2^n-1}$ and all possible Walsh codes $s=\{s_i\}_{i=0}^{2^n-1}$ of length $2^n$ proportional to $2^{2n}$. The FHT accomplishes this with a complexity proportional to $n*2^n$.

The complexity is thus further reduced to:

$$W_{ext} * (4096 + 16 * 4 * 4096/(16*N)) * 3.84*10^6 / 5120 = 9.4*10^9 \text{ [MAC/s]} \quad (7)$$

The above discussion clearly shows the advantages, from a complexity point of view, of separating the preamble detection operation into two main functions.

The FHT can be described as follows. For any dyadic number $2^n$, the $2^n$ Walsh codes of length $2^n$ are constructed as follows. Let $$i=[a_{n-1} \ldots a_0] \quad (8)$$

$$j=[b_{n-1} \ldots b_0] \quad (9)$$

be the binary representations of i and j. Then the i'th element of the j'th Walsh code is given by $$s_i^j = \prod_{k=0}^{n-1} (-1)^{a_k b_k}. \quad (10)$$

Figure 3:
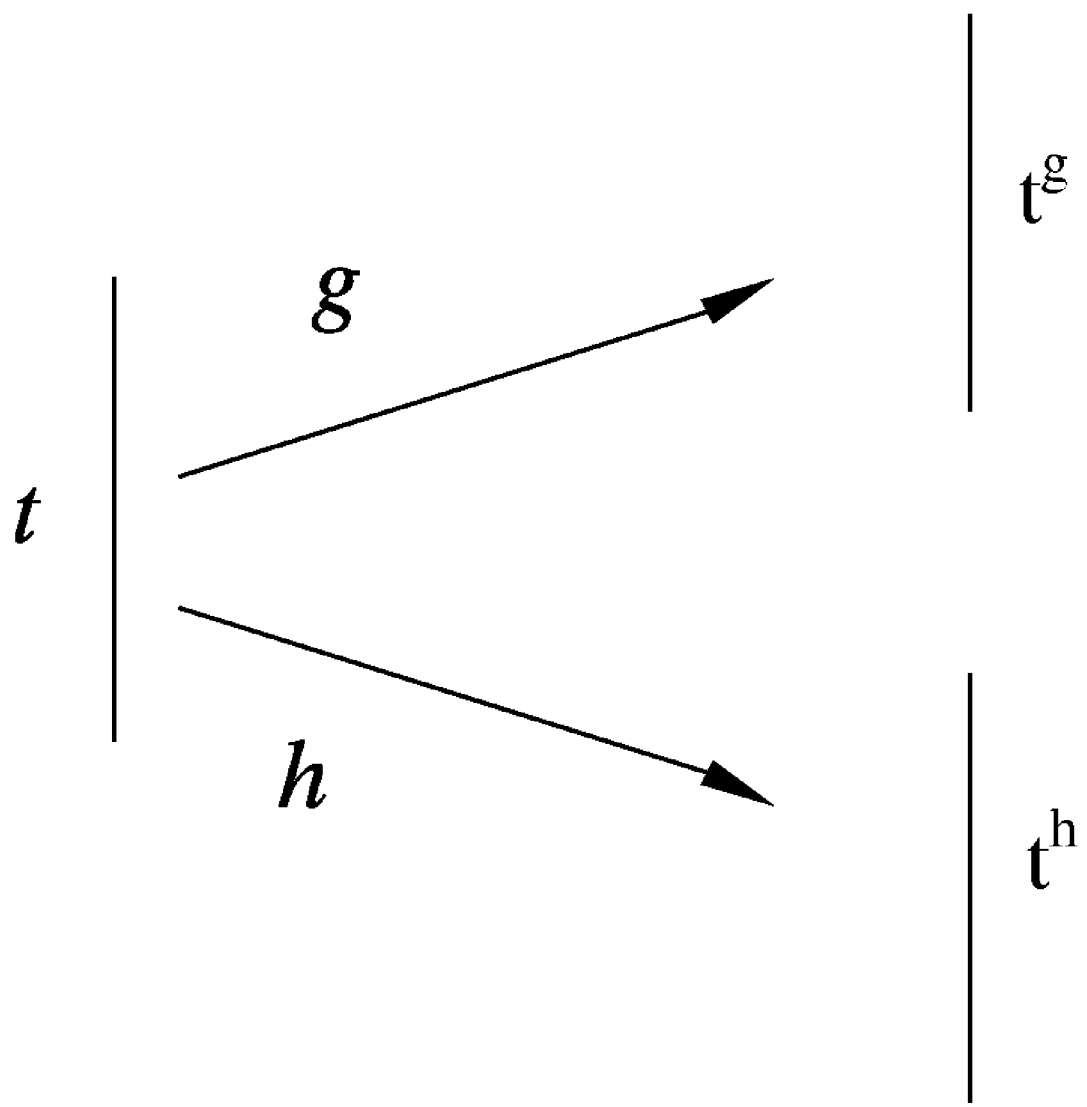
FIG. 3 illustrates the process of Fast Hadamard Transformation.

For a sequence $t=\{t_i\}_{i=0}^{2^n-1}$ the Hadamard transform $\tilde{t}=\{\tilde{t}_j\}_{j=0}^{2^n-1}$ is defined as $$\tilde{t}_j = \sum_{i=0}^{2^n-1} s_i^j t_i \quad (11)$$

which can be calculated through the FHT. Let h=[1 1] and g=[1 −1] be two filters, and define $t^g$ and $t^h$ as the sequences of length $2^{n-1}$ obtained by filtering t with h and g respectively followed by a sub sampling with a factor 2, see FIG. 3. This is the first step of the FHT In the second step of the FHT, the first step is performed on the both sequences $t^g$ and $t^h$ separately. This is repeated recursively until $2^n$ sequences of length 1 are obtained. Rearranging these numbers gives the Hadamard transform $\tilde{t}$ of t.

At present, no known HWA for preamble detection supports the previously described full complexity reduction with the included FHT functionality. Further, no existing general purpose HWA supports the solution where preamble detection is divided into one scrambling code correlation, useable for all codes, and a second signature despreading to form the PDP for each signature.

Although the invention will be described in the context of Fast Hadamard Transformation, the invention is equally applicable to regular Hadamard Transformation.

Therefore, according to a general aspect, the present invention provides a hardware accelerator for preamble detection that supports the division into scrambling code correlation and signature despreading and enables hardware Hadamard Transformation i.e. FHT on the same chip.

A basic embodiment of the invention will be described below with reference to FIG. 4.

Basically, according to the invention, a hardware accelerator 1 that is particularly suitable for the previously described partitioned form (i.e. complexity reduced) of preamble detection is partitioned into at least a reusable code correlation unit 30 and a preamble detection dedicated unit 40 for signature code despreading.

The main hardware units in the implementation are: a sample buffer 10 for received samples, a reader unit or addressing unit 20, a correlation unit 30, and an (F)HT unit 40. The remaining functionality can be implemented as software in a DSP. The hardware units are all placed on the same hardware chip or board. This will make it possible to pass high-speed data between the units, thereby increasing the efficiency of the various processes.

Figure 4:
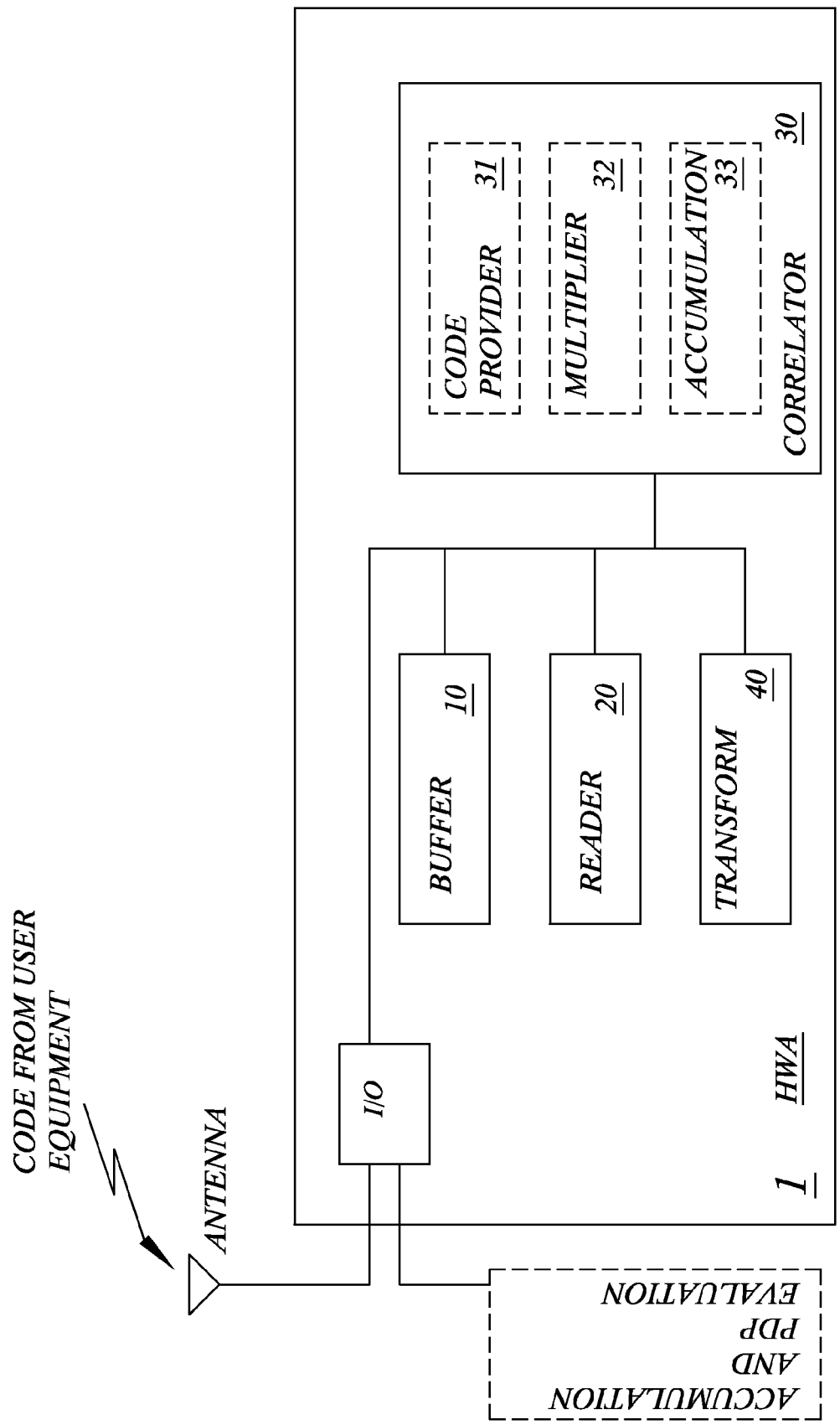
FIG. 4 illustrates an embodiment of a device according to the invention.

In its most basic form, with reference to FIG. 4, the present invention comprises a hardware accelerator (HWA) 1 particularly suitable for preamble detection. The HWA comprises a buffer 10 for storing input samples received at an antenna at a first rate, an addressing unit 20 that is configured for reading consecutive samples from the buffer 10 at a second rate, a correlator 30 that iteratively correlate a subset or all of the read samples from the addressing unit 20 with code symbols to provide a correlation output, and finally a preamble detection dedicated transformation unit 40 which enables Hadamard Transformation i.e. FHT of the correlation output for preamble detection. These units 10, 20, 30, 40 are all arranged on the same hardware chip or board to enable high-speed data transmissions between the units.

Functional units for performing subsequent non-coherent accumulation and peak evaluation for preamble detection can be implemented in software or additional hardware but need not be included on the same chip as the rest of the functional units. This is indicated by the dotted box to the left in the FIG. 4.

According to a specific embodiment, the sample buffer 10 allows processing of data at another rate then the rate of the antenna data, i.e. the buffering rate and the addressing rate are different.

The addressing unit 20, according to the invention, is adapted for iteratively reading a subset of input samples comprising a predetermined number K of consecutive input samples from the buffer 10 in parallel.

Per iteration, the correlation unit 30 is adapted for computing a set of S different time lags from the subset of K samples. After this, the following K samples are read by the addressing unit 20 and the next iteration is performed in the correlation unit 30. The results of the iterations are added to the accumulated results for the previous iterations. Basically, the computations comprise multiplying the K input samples with code symbols provided in the correlation unit 30. After a preset number of iterations the result comprises sums of products (accumulations) over input samples and code symbols for S time lags. The number of iterations depend on the total number of input samples that is required for the task i.e. mode of operation.

For preamble detection, after correlation, the accumulated results from the correlation unit 20 i.e. correlation output, are provided as input to the FHT unit 40, where the input is transformed and provided as input to further functionalities.

As mentioned above, no existing general purpose chip rate HWA supports the division into scrambling code correlation and signature despreading directly. Since this solution involves both striding, i.e. adding every 16th sample, the antenna data at a rate of 16 chip and a second despreading of the output from the HWA, see equation (4), a loosely coupled HWA cannot be made to support this division, but has to perform separate correlation synchronizations for each combined code leading to the complexity given in (3). Tightly coupled HWA partly support this solution, since both the input antenna data and the output can be processed in software, but the signature despreading has to be done in software. Processing the antenna data and the output from tightly coupled HWA in software leads to very costly preamble detection solutions.

Therefore, a further general aim of the invention is to provide a general purpose HWA that is capable of efficiently supporting the above described partitioned or two-part form of preamble detection, and at the same time being capable of performing searching and despreading, using the same hardware resources, without negatively affecting the efficiency of the preamble detection functionality.

In order to further explain the operation of the different processes of despreading and searching a more detailed description is supplied below.

Despreading

In CDMA communication systems, the data symbols $\{t_i\}_i$ are typically spread with a spreading code $\{s_l\}_{l=0}^{N-1}$ before transmission. The length N of the spreading code is called the spreading factor (SF) of the code. Let $T_c$ be the basic time of the system, also called the chip time, and define a simple illustrative chip pulse form according to $$p(t) = \begin{cases} 1, & 0 \leq t < T_c \\ 0, & \text{else} \end{cases}. \quad (12)$$

Figure 5:
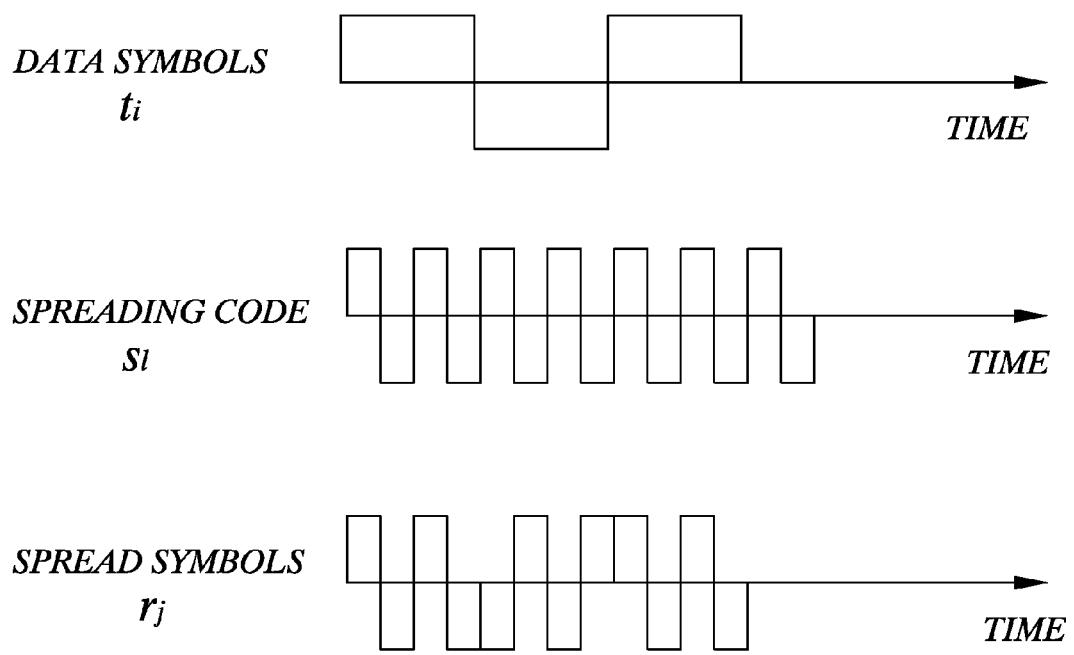
FIG. 5 schematically illustrates the process of spreading.

Then the spreading of the data symbols $\{t_i\}_i$ with the code $\{s_l\}_{l=0}^{N-1}$ results in the signal $$r(t) = \sum_{i=-\infty}^{\infty} r_j \cdot p(t - j \cdot T_c) \quad (13)$$

where the spread symbols are given by $r_j = t_i \cdot s_l$ and $j = i \cdot N + l$ is the unique decomposition of an integer j for which $0 \leq l \leq N$. The operation of spreading can also be schematically illustrated by the FIG. 5. Subsequently, the original data symbols can be reconstructed through the reverse operation of despreading according to:

$$t_i = \sum_{l=0}^{N-1} s_l \cdot r_{i \cdot N + l} \quad (14)$$

Figure 6:
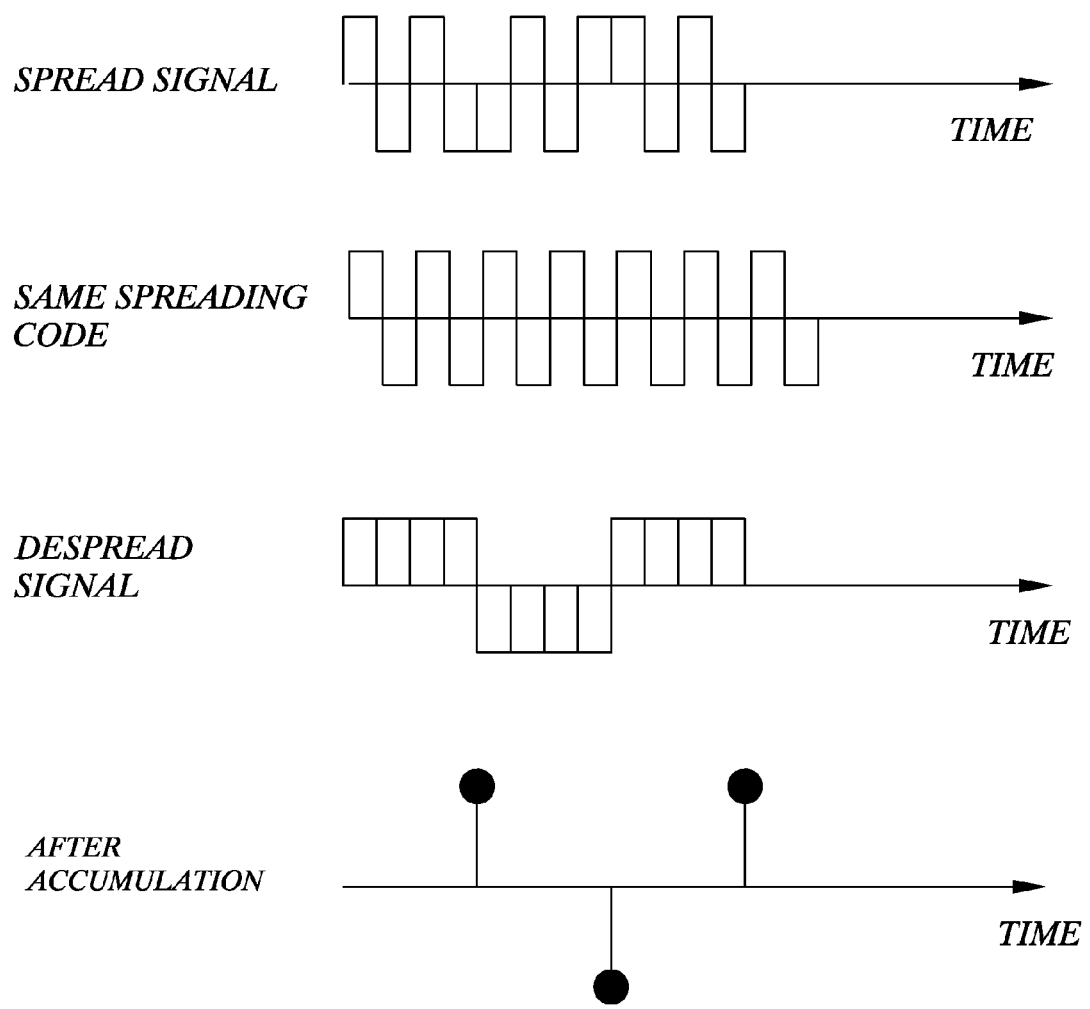
FIG. 6 schematically illustrates the process of correct despreading.
Figure 7:
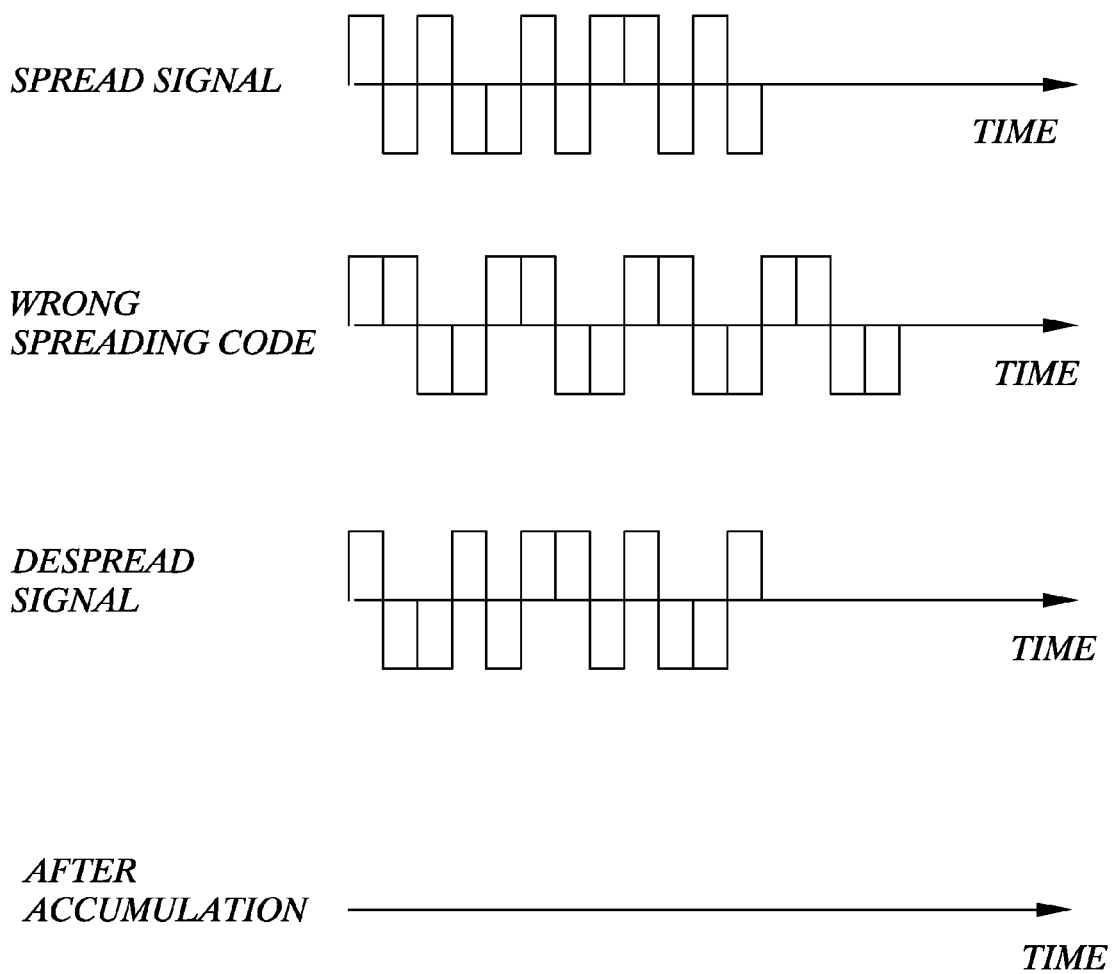
FIG. 7 schematically illustrates the process of incorrect despreading.

The operation of despreading can correspondingly be described as multiplying the signal with the same spreading code once more and accumulating over the symbol time. If the correct spreading code is used the result will be as illustrated in FIG. 6. An erroneous or misaligned spreading code would result in the "despread" signal of FIG. 7.

In this manner, only the desired user signal will be detected in the receiver. Any other user, with different spreading code(s), is suppressed by the operation of despreading. Even if the codes are not perfectly orthogonal, as above, the unwanted users will be significantly suppressed by despreading.

Despreading requires perfect synchronization between the spread symbols $\{r_j\}_j$ and the spreading code $\{s_l\}_{l=0}^{N-1}$. The operation of spreading data before transmission and despreading after reception of the signal is used to suppress any interferer that has not been modulated with the correct spreading code.

If the chip time $T_c$ is small, the operation of despreading will be extremely complex, and must therefore be implemented in hardware accelerators HWA.

Searching

Figure 8:
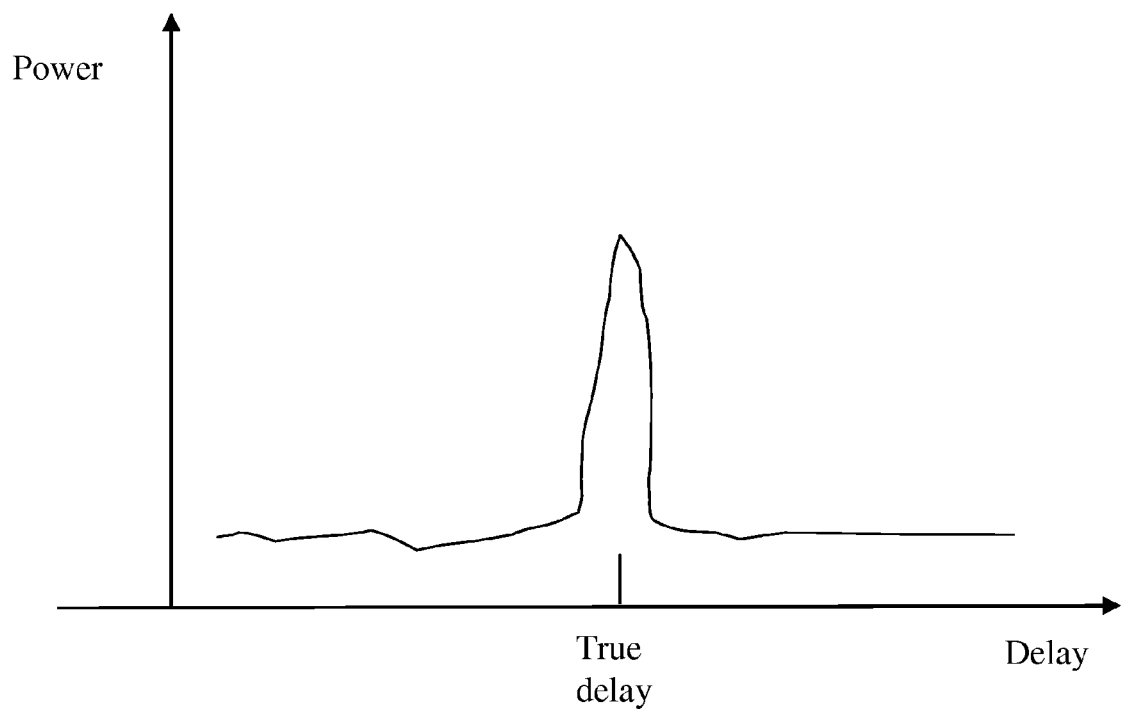
FIG. 8 illustrates cell searching.

An estimate of the (finger) delays used for despreading, is obtained using a so-called search function or searcher. The search function uses a Power Delay Profile (PDP), showing the energy in the e.g. despread pilot signals as a function of the candidate time delays of the spreading code, see FIG. 8. When the code is aligned to the received signal, the despread symbols contain a large amount of energy, and when it is not aligned, there is very little energy in the despread symbols.

The calculation of one specific despread symbol (pilot) at different candidate delays is equivalent to a correlation of the received samples with the spreading code. Therefore, the chip rate part of the search functionality is usually implemented as a correlation. When an additional scrambling code is used to differentiate the UE:s, the spreading code must be multiplied with this scrambling code in the formulas above.

At present, as stated before, there is a need for a hardware accelerator or co-processor that is capable of performing various chip rate functions, including preamble detection, in an efficient and improved manner.

Figure 9:
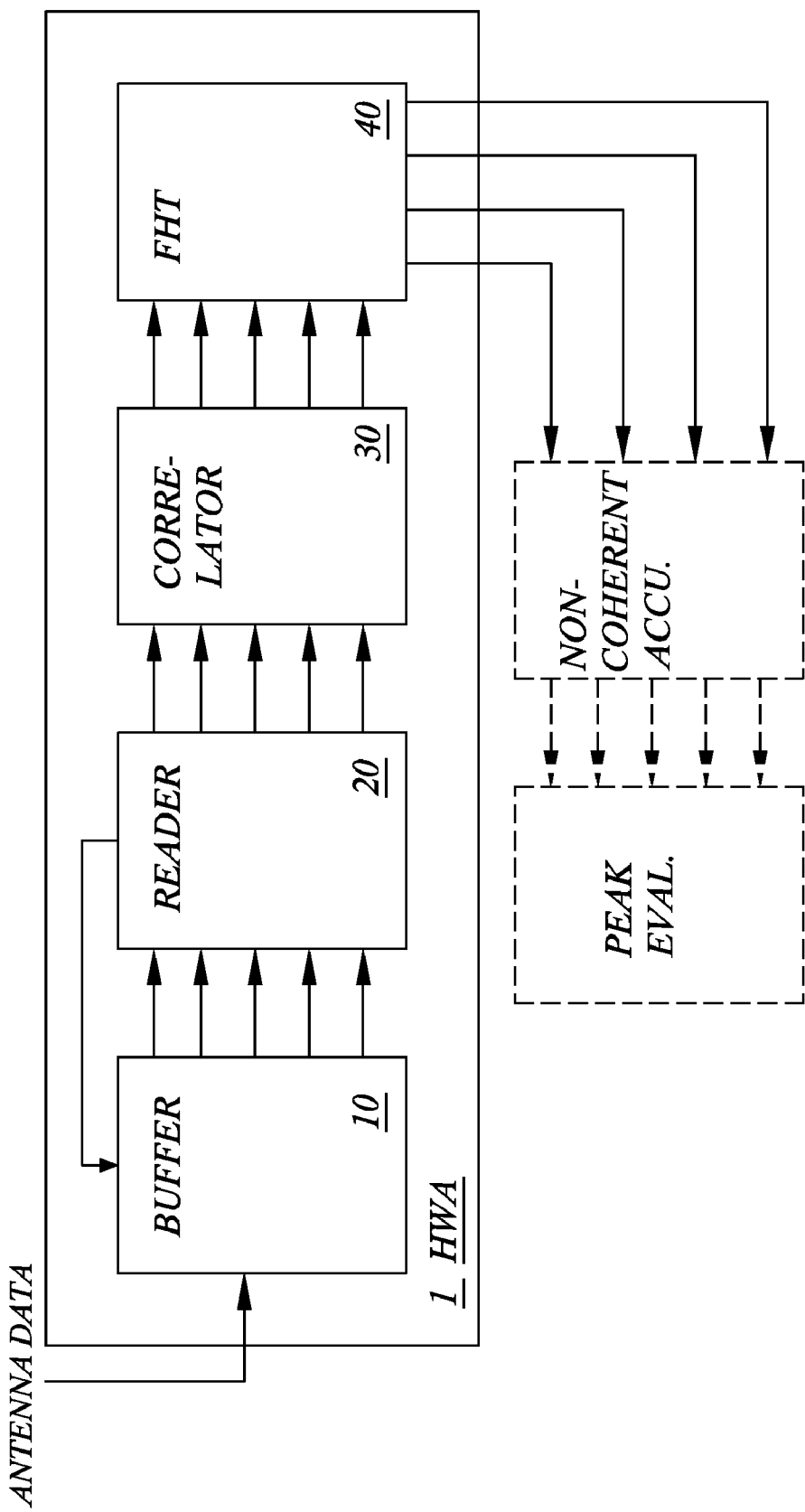
FIG. 9 illustrates another embodiment of a device according to the invention.

Therefore, a specific embodiment of the invention comprises a general chip rate hardware accelerator that is capable of performing various chip rate functions, using the same hardware resources, including the previously described partitioned preamble detection, in an efficient and improved manner. The embodiment will be described with reference to FIGS. 9-11, the only difference being in how the various units are configured, i.e. the various units are the same but their individual functionalities are somewhat varied. Accordingly, the buffer 10 and addressing unit 20 are substantially identical to the previously described embodiments. The buffer 10 stores input samples with antenna data at a first rate, and the addressing unit 20 reads subsets of predetermined numbers of samples from the buffer 10 at a second rate, where the first rate and the second rate differ, and thereby enabling processing data at a rate other than the rate of arrival of antenna data.

The correlation unit 30, according to the invention, is configured for supporting a plurality of modes of operation, including at least preamble detection, searching and despreading. For searching the correlation unit 30 is configured for computing S time lags for one correlation i.e. one sum of products over multiples of K input samples. The searching correlation is thereby performed over K samples and code symbols, per iteration. For preamble detection the correlation unit 30 is configured for computing S time lags for 16 sums ($sum_1$ to $sum_{16}$) over K input samples and per iteration. The 16 sums correspond to the inner sums of Equation (4). Finally, for despreading the correlation unit 30 is configured for computing correlations over 1 to K samples and code symbols per iteration. In this case the number of samples to correlate and the number of symbols depends on the spreading factor of the channel.

For searching and despreading the FHT unit 40 only acts as a buffer between the correlation unit 30 and the subsequent functions.

For preamble detection the preamble dedicated HT or FHT unit 40, according to the invention, applies (Fast) Hadamard Transformation to the 16 sums ($sum_1$ to $sum_{16}$) to perform signature despreading. This is repeated for the S time lags.

The FHT unit 40 consequently applies the Fast Hadamard Transformation to the 16 sums to perform the signature despread. Different time lags are processed sequentially. The CDPs for different sections are accumulated non-coherently into PDPs before peak evaluation. The two latter functions can be performed using software in an on-chip DSP, or possibly a combination of software and additional hardware.

To arrive at a result for the full search window, as given in Eq. (1), the process is repeated for all multiples of S time lags within the extended window.

Further detailed embodiments of the correlation unit 30 and the FHT unit 40 will be described below with reference to FIGS. 10-11.

Figure 10:
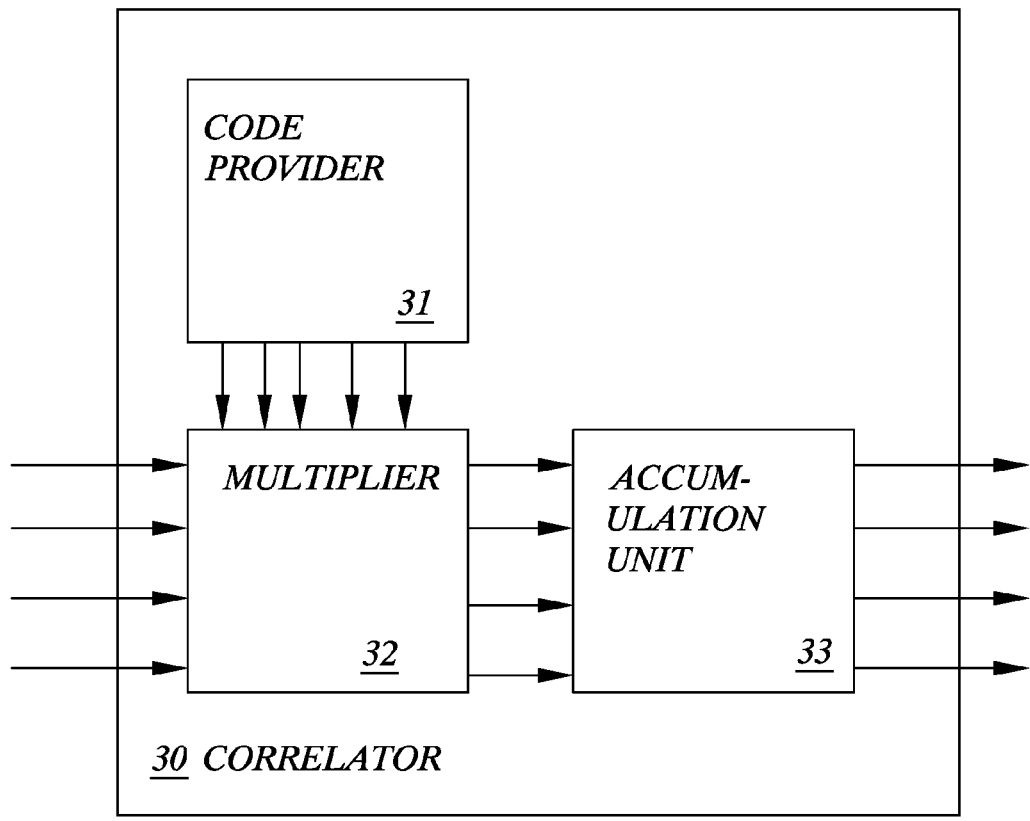
FIG. 10 illustrates a specific embodiment of a device according to the invention.

Basically, with reference to FIG. 10, the correlation unit 30 is adapted for supporting functions such as despreading, searching and preamble detection. In order to provide those functionalities the correlation unit 30, according to a further embodiment, comprises three main units: a code providing unit 31, a multiplier 32 and an accumulation unit 33.

The code generator 31 generates a complex code. The code is a combination of a scramble code, a spreading code, a pattern of pilot bits, etc, depending on the mode of operation. For example, for searching the code is a combination of a scrambling code and a pattern of pilot bits, but for despreading it is a scrambling code and a spreading code. For preamble detection it is essentially a scrambling code. Each code symbol is a combination of +1, −1, +j, and −j.

The code generator 31 is, according to a specific embodiment, adapted to generate or provide a sequence of up to K+S−1 code symbols. The sequence is a combination of scrambling code, a spreading code, a pattern of known bits (pilot bits), etc. depending on the mode of operation, i.e. despreading, preamble detection or searching. For searching the code is a combination of a scrambling code and a pattern of pilot bits, and for despreading it is a scrambling code and a spreading code. For preamble detection it is a scrambling code.

According to a specific embodiment the multiplier unit 32 is implemented as an array of multipliers, each capable of multiplying an input sample from the addressing unit 20 with a code symbol from the code generator 31. in addition, the multiplier unit 32 may comprise a set of adders to accumulate over a preset number of the resulting products. The result of this is a set of correlations between input samples and code symbols. Consequently, the input to the multiplier consists of the consecutive samples from the addressing unit 20 and the code symbols from the code generator 31. The multiplier 32 is configured in dependence of the mode of operation.

The multiplier unit 32, according to a specific embodiment, comprises an array of K by S complex multipliers, each capable of multiplying a complex sample by a complex code symbol. Because of the simplicity of the code symbols, the multipliers can be implemented using a set of adders. In addition, the multiplier unit 32 may comprise a set of adders to accumulate over 1 up to K samples and code symbols, per iteration. The input to the unit is K consecutive samples and K+S−1 code symbols. The configuration of the array depends on the mode of operation.

For searching, the multiplier unit 32 is used to produce S time lags for one correlation, i.e., part of one CDP. The correlation is performed over K samples and code symbols, per iteration For preamble detection, the multiplier unit 32 is used to produce S time lags for 16 correlations per iteration, i.e., parts of 16 CDPs.

Last, for despreading, the multiplier unit 32 is used to produce correlations over 1 up to K samples and code symbols per iteration, i.e., the output is a number of despread, or partly despread, symbols. The number of samples to correlate, and the number of symbols, depends on the spreading factor of the channel.

The accumulation unit 33 is used for accumulation over more samples than what is performed in the correlation unit and this depends on the mode of operation of the correlation unit. Thus, the accumulation unit 33 accumulates over multiples of iterations to produce correlations over multiples of input samples and code symbols.

For searching, accumulation over multiples of K samples is performed for the S time lags for the single correlation (CDP). For preamble detection, accumulation is performed for S time lags for all 16 correlations (CDPs). In this case, accumulation is in fact done over multiples of samples spaced 16 samples apart. Finally, for despreading, accumulation is done over multiples of K samples for cases where the spreading factor is higher than K.

Figure 11:
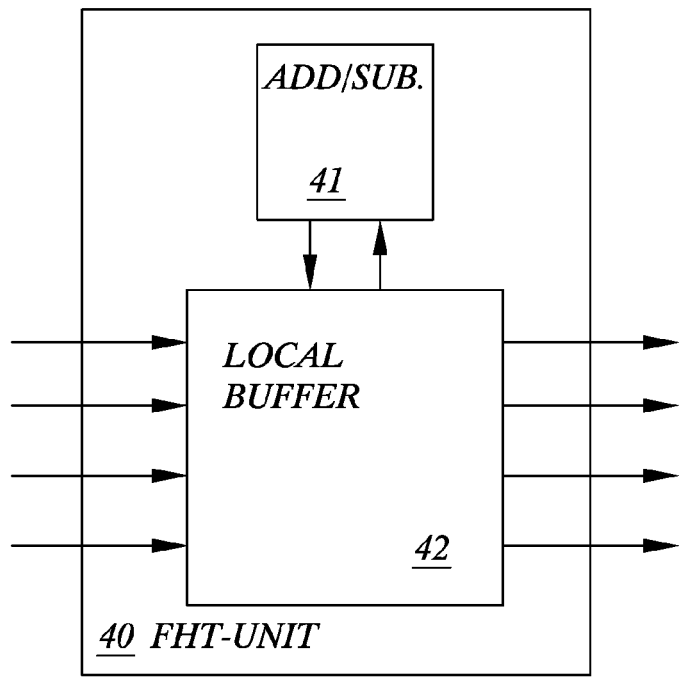
FIG. 11 illustrates another specific embodiment of a device according to the invention.

The FHT unit 40 can, according to a specific embodiment as illustrated by FIG. 11, comprise a buffer unit 42 and an add/subtract unit 41. For preamble detection the FHT unit 40 is adapted for applying FHT to the data from the correlation unit 30 by means of pair wise addition or subtraction in the add/subtract unit 41. For searching and despreading the FHT unit 40 is adapted to function as a buffer between the correlation unit 30 and the subsequent functions.

The advantages of the present invention comprise:
A preamble detection hardware chip supporting division into scrambling code correlation and a second signature despreading and including hardware implemented FHT.
A general purpose chip rate task hardware accelerator supporting division into scrambling code correlation and a second signature despreading, using the same hardware resources.
A decrease in complexity for preamble detection in a hardware accelerator capable of both general chip rate functions and preamble detection including FHT.

It will be understood by those skilled in the art that various modifications and changes may be made to the present invention without departure from the scope thereof, which is defined by the appended claims.

The invention claimed is:

1. A hardware accelerator device useable for preamble detection of a Physical Random Access Channel (PRACH) in a CDMA based communication system, comprising:
means for storing/buffering input samples received at an antenna at a first rate;
means for reading a predetermined consecutive number of said input samples in parallel at a second different rate; and
wherein said device is further partitioned into at least one reusable unit providing code correlation, and at least one preamble detection dedicated unit providing signature code despreading, said reusable unit comprising means for correlating, for at least one iteration, at least a subset of said read predetermined consecutive number of input samples with a predetermined code to provide a correlation output for a preset number of time lags depending on a mode of operation of said device; and said preamble detection dedicated unit comprising means for preamble detection configured for providing Hadamard Transformation of said correlation output to enable preamble detection, and wherein all said means are arranged on a single hardware chip to enable high-speed data transmissions between the respective means.

2. The device according to claim 1, wherein said means are adapted for providing Fast Hadamard Transformation.

3. The device according to claim 1, wherein said mode of operation comprises a chip rate functionality of at least one of searching, despreading or preamble detection.

4. The device according to claim 1, wherein said predetermined consecutive number of input samples is 16.

5. The device according to claim 1, wherein said correlation means are arranged for calculating a preset number of time lags from a preset number of samples and code symbols.

6. The device according to claim 1, wherein said correlating means further comprise means for providing code symbols, means for multiplying an input sample with code symbols, and means for accumulating over up to said predetermined number of input samples per iteration.

7. The device according to claim 1, wherein if said mode of operation is searching, said multiplying means are arranged for providing a preset number of time lags for one sum of products over said predetermined number of input samples per iteration.

8. The device according to claim 1, wherein if said mode of operation is preamble detection said multiplying means are arranged for providing a preset number of time lags for 16 sums of products over a preset number of input samples and per iteration.

9. The device according to claim 1, wherein if said mode of operation is despreading said multiplying means are arranged for providing sums of products from one to said predetermined number of input samples and code symbols depending on the spreading factor of the channel.

10. The device according to claim 1, wherein said transformation means are adapted for performing Fast Hadamard Transformation of the 16 sums from the correlation means and repeated for said preset number of time lags to enable signature despreading.

11. The device according to claim 1, wherein said transformation means are adapted to be software implemented.

12. A method of providing an improved hardware accelerator device for preamble detection of a Physical Random Access Channel (PRACH) in a CDMA based communication system, comprising:

providing means for storing/buffering input samples received at an antenna at a first rate;

providing means for reading a predetermined consecutive number of said input samples in parallel at a second different rate; and partitioning said device into at least one reusable unit providing code correlation, and at least one preamble detection dedicated unit providing signature code despreading, said reusable unit comprising means for correlating, for at least one iteration, at least a subset of said read predetermined consecutive number of input samples with a predetermined code to provide a correlation output for a preset number of time lags depending on a mode of operation of said device; and said preamble detection dedicated unit comprising means for preamble detection configured for providing Hadamard Transformation of said correlation output to enable preamble detection, and providing all said means on a single hardware chip to enable high-speed data transmissions between the respective means.

* * * * *